(12) United States Patent
Onuma et al.

(10) Patent No.: US 12,148,935 B2
(45) Date of Patent: Nov. 19, 2024

(54) ELECTROCHEMICAL DEVICE

(71) Applicant: Panasonic Intellectual Property Management Co., Ltd., Osaka (JP)

(72) Inventors: Shigenori Onuma, Kyoto (JP); Takashi Kakuwa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 773 days.

(21) Appl. No.: 17/323,905

(22) Filed: May 18, 2021

(65) Prior Publication Data

US 2021/0273237 A1    Sep. 2, 2021

Related U.S. Application Data

(63) Continuation of application No. PCT/JP2020/040477, filed on Oct. 28, 2020.

(30) Foreign Application Priority Data

Dec. 3, 2019    (JP) .................................. 2019-218810
Sep. 29, 2020    (JP) .................................. 2020-162801

(51) Int. Cl.
*H01M 4/90*       (2006.01)
*H01M 8/0206*     (2016.01)
(Continued)

(52) U.S. Cl.
CPC ....... *H01M 4/9041* (2013.01); *H01M 4/9016* (2013.01); *H01M 8/0206* (2013.01); *H01M 8/021* (2013.01); *H01M 8/0228* (2013.01)

(58) Field of Classification Search
CPC .......................... H01M 4/9016; H01M 4/9041
(Continued)

(56) References Cited

U.S. PATENT DOCUMENTS

2007/0298309 A1*  12/2007  Vyas ................... H01M 8/0228
                                                            429/514
2009/0023047 A1*  1/2009  Kume ................. H01M 8/0273
                                                            429/480

(Continued)

FOREIGN PATENT DOCUMENTS

JP         5-501737         4/1993
JP         2010-129394      6/2010
(Continued)

OTHER PUBLICATIONS

Ugitech.com Stainless steel grade listed in the international standard ISO 15510:2010; retrieved from the Internet <URL: https://www.ugitech.com/fileadmin/user_upload/Ugitec/Documents_publics/Certifications/iso15510.pdf> (Year: 2010).*

(Continued)

*Primary Examiner* — James M Erwin
(74) *Attorney, Agent, or Firm* — Rimon P.C.

(57) ABSTRACT

An electrochemical device includes an electrolyte membrane, an anode disposed on a first main surface of the electrolyte membrane, a cathode disposed on a second main surface of the electrolyte membrane, an anode separator disposed on the anode, and a cathode separator disposed on the cathode. At least one of the anode separator or the cathode separator includes a metal substrate sheet and a conductive layer disposed on the metal substrate sheet and containing a metal oxide and a metal hydroxide.

15 Claims, 3 Drawing Sheets

(51) Int. Cl.
*H01M 8/021* (2016.01)
*H01M 8/0228* (2016.01)

(58) Field of Classification Search
USPC .......................................................... 429/523
See application file for complete search history.

(56) References Cited

U.S. PATENT DOCUMENTS

| | | | |
|---|---|---|---|
| 2014/0141351 A1* | 5/2014 | Shinohara | H01M 8/0258 |
| | | | 429/457 |
| 2016/0276680 A1* | 9/2016 | Kuribayashi | H01M 8/2483 |
| 2018/0265994 A1 | 9/2018 | Yamagiwa et al. | |
| 2019/0071784 A1 | 3/2019 | Yoshinaga et al. | |
| 2019/0165383 A1* | 5/2019 | Fujita | H01M 8/0215 |
| 2019/0296364 A1 | 9/2019 | Nakano et al. | |

FOREIGN PATENT DOCUMENTS

| | | |
|---|---|---|
| JP | 2018-154865 | 10/2018 |
| JP | 2019-049043 | 3/2019 |
| JP | 2019-167619 | 10/2019 |
| KR | 10-2015-074768 A | 7/2015 |
| WO | 1991/009990 | 7/1991 |
| WO | 2008/136306 A1 | 11/2008 |

OTHER PUBLICATIONS

The EPC Office Action dated Nov. 17, 2023 for the related European Patent Application No. 20888762.0.
International Search Report of PCT application No. PCT/JP2020/040477 dated Dec. 8, 2020.

* cited by examiner

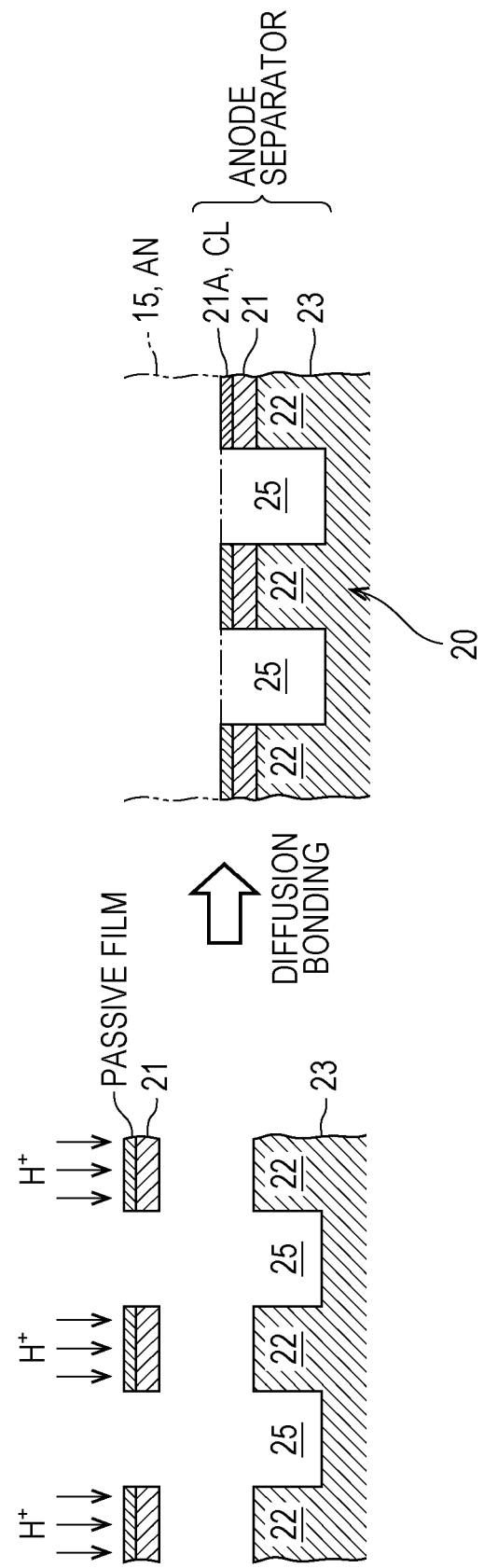

ELECTROCHEMICAL DEVICE

BACKGROUND

1. Technical Field

The present disclosure relates to an electrochemical device.

2. Description of the Related Art

Renewable energy has recently been replacing fossil fuels, which cause emissions of greenhouse gases, because of global warming concerns. In general, however, renewable energy such as sunlight and wind power is often unstable and dependent on climate change or other factors, so that the electric power generated from renewable energy is not always available when needed.

To solve this issue, excess electric power generated from renewable energy is used to, for example, generate and store hydrogen. In this process, hydrogen generation can be carried out in an electrolyzer. Hydrogen storage into a tank can be carried out through an electrochemical hydrogen pump. In case of shortage of electric power generated from renewable energy, the supply and demand of renewable energy can be kept well-balanced by generation of electric power in a fuel cell using, as fuel, hydrogen stored in a tank.

The generation, storage, and use of hydrogen through use of electric power generated from renewable energy to create a clean hydrogen society require involvement of various electrochemical devices, such as fuel cells, electrolyzers, and electrochemical hydrogen pumps. These electrochemical devices thus have been developed for many years.

For example, Japanese Patent No. 5353205 discloses a separator including a conductive layer containing conductive particles, an intermediate layer, and a conductive carbon layer, which are stacked on the surface of a metal substrate sheet. This configuration improves the conductivity and corrosion resistance of a separator for fuel cells.

SUMMARY

However, Japanese Patent No. 5353205 has not sufficiently studied improvements of the durability and reliability of electrochemical devices.

One non-limiting and exemplary embodiment provides an electrochemical device that may have higher durability and reliability than existing devices.

In one general aspect, the techniques disclosed here feature an electrochemical device including an electrolyte membrane, an anode disposed on a first main surface of the electrolyte membrane, a cathode disposed on a second main surface of the electrolyte membrane, an anode separator disposed on the anode, and a cathode separator disposed on the cathode. At least one of the anode separator or the cathode separator includes a metal substrate sheet and a conductive layer disposed on the metal substrate sheet and containing a metal oxide and a metal hydroxide.

An electrochemical device in an aspect of the present disclosure may have advantages of being more durable and reliable than existing devices.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a view of an example method for producing a conductive layer containing chromium oxide and chromium hydroxide on a metal substrate sheet.

DETAILED DESCRIPTION

Figure 1:
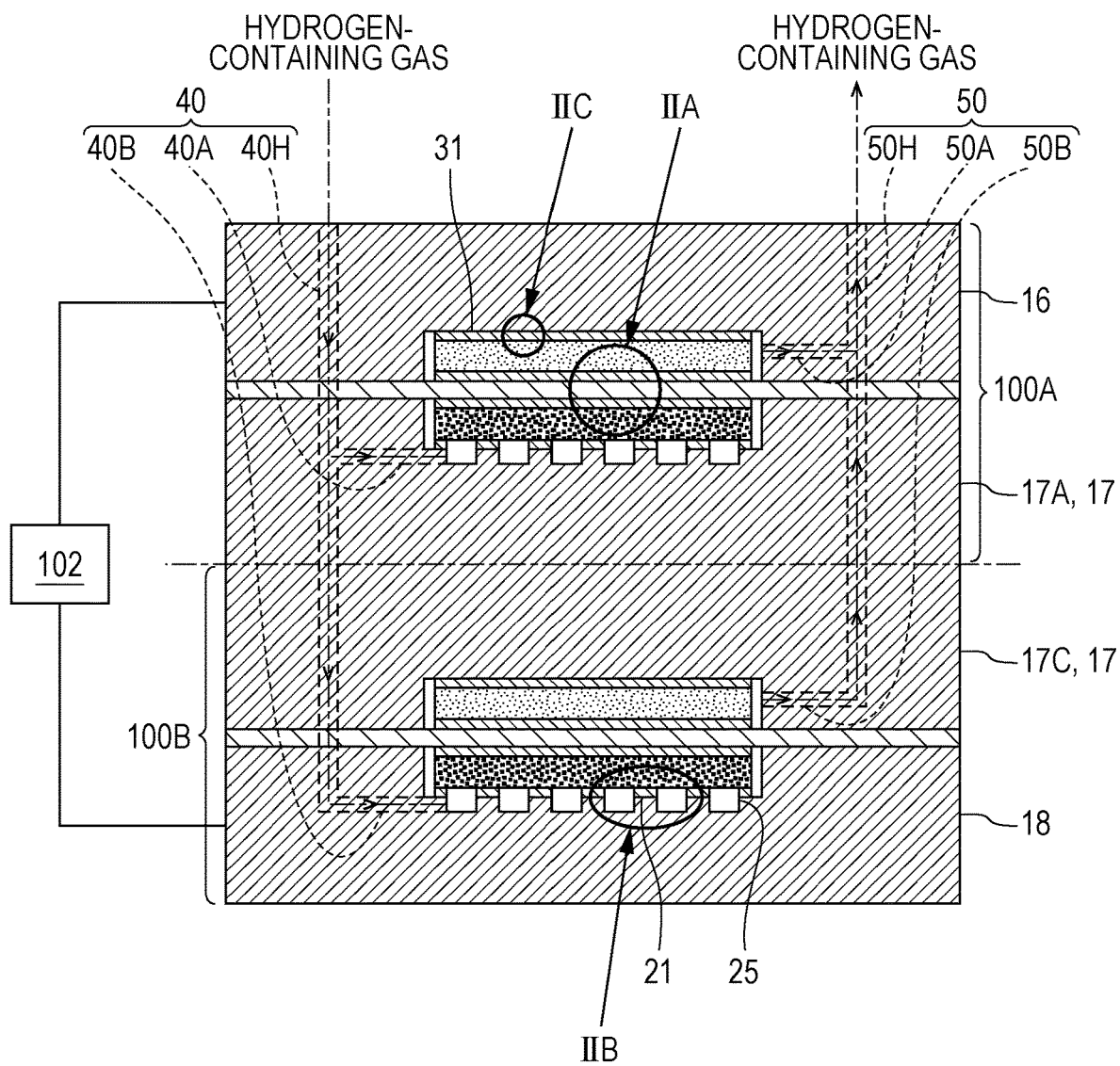
FIG. 1 is a view of an example electrochemical hydrogen pump according to an embodiment.

The following findings are made by studying improvements of the durability and reliability of electrochemical devices.

In Japanese Patent No. 5353205, the separator has a multilayer body with 4 layers including the metal substrate sheet, the conductive layer, the intermediate layer, and the conductive carbon layer, as described above. In general, as the number of layers in the multilayer body of a separator increases, the durability and reliability of a device decreases because of, for example, decreased adhesion between the layers in the multilayer body and void generation between the layers in the multilayer body.

When the separator is, for example, a stainless steel member, a passive film containing highly corrosion-resistant chromium oxide forms on the surface of this member.

WO 2008/136306 has reported that the electrical conductivity of such a passive film is improved by electrochemical injection of protons ($H^+$) into the passive film.

The inventors of the present disclosure have found that the durability and reliability of an electrochemical device may be improved by using such a technique of introducing protons into a passive film, completing the following aspects of the present disclosure.

Specifically, an electrochemical device in a first aspect of the present disclosure includes an electrolyte membrane, an anode disposed on a first main surface of the electrolyte membrane, a cathode disposed on a second main surface of the electrolyte membrane, an anode separator disposed on the anode, and a cathode separator disposed on the cathode. At least one of the anode separator or the cathode separator includes a metal substrate sheet and a conductive layer disposed on the metal substrate sheet and containing a metal oxide and a metal hydroxide.

This configuration may allow the electrochemical device according to the present disclosure to have higher durability and reliability than existing devices.

Specifically, the electrochemical device in this aspect includes a conductive layer containing a metal hydroxide and a metal oxide and formed by modifying a passive film on a metal surface. The electrochemical device in this aspect allows the multilayer body of the anode separator to have a smaller number of layers than that of the separator disclosed in Japanese Patent No. 5353205. The electrochemical device in this aspect also allows the multilayer body of the cathode separator to have a smaller number of layers than that of the separator disclosed in Japanese Patent No. 5353205.

The electrochemical device in this aspect can prevent or reduce a decrease in adhesion between the layers in the multilayer bodies and void generation between the layers in the multilayer bodies, resulting in high durability and high reliability of the device. The electrochemical device in this aspect allows the multilayer bodies described above to have a smaller number of layers, which can reduce the costs of the separators.

According to an electrochemical device in a second aspect of the present disclosure, in the electrochemical device as set forth in the first aspect, the metal hydroxide may be produced by introducing protons to a metal oxide-containing layer.

This configuration can appropriately increase the content of highly conductive metal hydroxide in the layer containing a less conductive metal oxide in the electrochemical device in this aspect.

According to an electrochemical device in a third aspect of the present disclosure, in the electrochemical device as set forth in the first or second aspect, the metal oxide may be chromium oxide, and the metal hydroxide may be chromium hydroxide.

According to an electrochemical device in a fourth aspect of the present disclosure, in the electrochemical device as set forth in any one of the first to third aspects, the metal substrate sheet may be made of stainless steel.

In general, a passive film containing chromium oxide forms on the surface of stainless steel through oxidation of chromium, a component of stainless steel, with oxygen in the atmosphere. When the metal substrate sheet is made of stainless steel in the electrochemical device according to this aspect, it is easy to form a passive film containing highly corrosion-resistant chromium oxide on the surface of the metal substrate sheet.

According to an electrochemical device in a fifth aspect of the present disclosure, in the electrochemical device as set forth in the fourth aspect, the metal substrate sheet may be made of SUS316 or SUS316L.

Among various types of stainless steel, SUS316 and SUS316L are less expensive and have good properties in terms of, for example, corrosion resistance and hydrogen embrittlement resistance. The use of the metal substrate sheet made of SUS316 or SUS316L in the electrochemical device according to this aspect can reduce the cost of the metal substrate sheet while appropriately maintaining the performance of the electrochemical device.

According to an electrochemical device in a sixth aspect of the present disclosure, in the electrochemical device as set forth in the fourth aspect, the metal substrate sheet may be made of 4401-316-00-I or 4436-316-00-I, or 4404-316-03-I, 4432-316-03-I, or 4436-316-91-I.

SUS316 in Japanese Industrial Standards (JIS) corresponds to 4401-316-00-I or 4436-316-00-I in International Organization for Standardization (ISO) 15510. SUS316L in Japanese Industrial Standards corresponds to 4404-316-03-I, or 4432-316-03-I, 4436-316-91-I, or 4401-316-00-I in ISO 15510.

The electrochemical device in a seventh aspect of the present disclosure, in the electrochemical device as set forth in the fourth aspect, the metal substrate sheet may be made of 1.4401 or 1.4436, or 1.4404, 1.4432, or 1.4435.

SUS316 in Japanese Industrial Standards (JIS) corresponds to 1.4401 or 1.4436 in European Standards (ENs). SUS316L in Japanese Industrial Standards corresponds to 1.4404, 1.4432, or 1.4435 in European Standards.

According to an electrochemical device in an eighth aspect of the present disclosure, in the electrochemical device as set forth in the fourth aspect, the metal substrate sheet may be made of S31600 or S31603.

SUS316 in Japanese Industrial Standards (JIS) corresponds to S31600 in Unified Numbering System (UNS). SUS316L in Japanese Industrial Standards corresponds to S31603 in Unified Numbering System.

According to an electrochemical device in a ninth aspect of the present disclosure, in the electrochemical device as set forth in the fourth aspect, the metal substrate sheet may be made of S31608 or S31603.

SUS316 in Japanese Industrial Standards (JIS) corresponds to S31608 in Guobiao (GB) standards. SUS316L in Japanese Industrial Standards corresponds to S31603 in Guobiao standards.

According to an electrochemical device in a tenth aspect of the present disclosure, in the electrochemical device as set forth in any one of the first to ninth aspects, the conductive layer may have a thickness more than or equal to 0.001 µm and less than or equal to 5 µm.

According to an electrochemical device according to an eleventh aspect of the present disclosure, in the electrochemical device as set forth in any one of the first to tenth aspects, the conductive layer may contain at least one of fluorine at a fluorine concentration of 0.1 atom % or more or lithium at a lithium concentration of 0.01 atom % or more.

This configuration improves the conductivity of the conductive layer and improves the corrosion resistance of the conductive layer to prevent or reduce degradation of the conductive layer.

An embodiment of the present disclosure will be described below with reference to the attached drawings. The embodiment described below illustrates examples of the aspects described above. The shapes, materials, and components, and the arrangement positions and connection configuration of the components described below are illustrative only and should not be construed as limiting the aspects unless otherwise mentioned in Claims. Among the components described below, the components that are not mentioned in the independent claim indicating the broadest concept of each aspect are described as optional components. Redundant description of the components assigned with the same reference characters in the drawings may be avoided. Each component is schematically illustrated in the drawings for easy understanding, and the shape, the dimensional ratio, and the like may not be accurately depicted.

Embodiment

In the electrochemical device, the anode fluid in the anode and the cathode fluid in the cathode may be various gases or liquids. For example, when the electrochemical device is an electrochemical hydrogen pump, the anode fluid may be a hydrogen-containing gas. For example, when the electrochemical device is an electrolyzer, the anode fluid may be water vapor or liquid water. For example, when the electrochemical device is a fuel cell, the anode fluid and the cathode fluid may be a hydrogen-containing gas and an oxidant gas, respectively.

In the following embodiment, the structure and operation of an electrochemical hydrogen pump, an example electrochemical device, where the anode fluid is a hydrogen-containing gas will be described.

Device Structure
General Structure of Electrochemical Hydrogen Pump

Figure 2A:
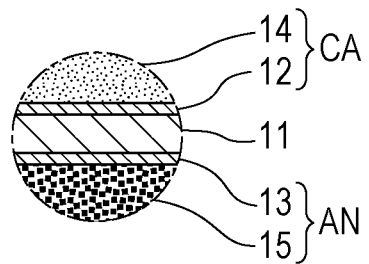
FIG. 2A is an enlarged view of the portion IIA of the electrochemical hydrogen pump in FIG. 1.

FIG. 1 is a view of an example electrochemical hydrogen pump according to an embodiment. FIG. 2A is an enlarged view of the portion IIA of the electrochemical hydrogen pump in FIG. 1.

Referring to FIG. 1, an electrochemical hydrogen pump 100 includes a hydrogen pump unit 100A and a hydrogen pump unit 100B. The hydrogen pump unit 100A is disposed above the hydrogen pump unit 100B.

FIG. 1 illustrates two hydrogen pump units: the hydrogen pump unit 100A and the hydrogen pump unit 1006; however, the number of hydrogen pump units is not limited to this example. In other words, the number of hydrogen pump units can be set to an appropriate number on the basis of, for example, the operation conditions such as the amount of hydrogen pressurized in the cathode CA of the electrochemical hydrogen pump 100.

The hydrogen pump unit 100A includes an electrolyte membrane 11, an anode AN, a cathode CA, a first cathode separator 16, and an intermediate separator 17. The hydrogen pump unit 100B includes an electrolyte membrane 11, an anode AN, a cathode CA, the intermediate separator 17, and a first anode separator 18. The intermediate separator 17 functions as the anode separator of the hydrogen pump unit 100A and also functions as the cathode separator of the hydrogen pump unit 1006. In other words, in the electrochemical hydrogen pump 100 according to this embodiment, the anode separator of the hydrogen pump unit 100A is integrated with the cathode separator of the hydrogen pump unit 1006; however, the present disclosure is not limited to this structure. Although not shown in the figure, the anode separator may be separate from the cathode separator. For easy understanding, a portion of the intermediate separator 17 that functions as the anode separator is referred to as a second anode separator 17A. A portion of the intermediate separator 17 that functions as the cathode separator is referred to as a second cathode separator 17C.

Referring to FIG. 2A, the anode AN is disposed on a first main surface of the electrolyte membrane 11. The anode AN is an electrode including an anode catalyst layer 13 and an anode gas diffusion layer 15.

The cathode CA is disposed on a second main surface of the electrolyte membrane 11. The cathode CA is an electrode including a cathode catalyst layer 12 and a cathode gas diffusion layer 14.

In the hydrogen pump unit 100A and the hydrogen pump unit 100B as described above, the electrolyte membrane 11 is sandwiched between the anode AN and the cathode CA in such a manner that the anode catalyst layer 13 and the cathode catalyst layer 12 are each in contact with the electrolyte membrane 11. A cell including the cathode CA, the electrolyte membrane 11, and the anode AN is referred to as a membrane electrode assembly (hereinafter MEA).

Between the first cathode separator 16 and the second anode separator 17A and between the second cathode separator 17C and the first anode separator 18, the electrolyte membrane 11 is disposed and an annular seal member (not shown) is sandwiched so as to surround the periphery of the MEA in plan view. An annular flat insulator may be disposed between the first cathode separator 16 and the second anode separator 17A and between the second cathode separator 17C and the first anode separator 18.

This configuration prevents short-circuiting between the first cathode separator 16 and the second anode separator 17A and short-circuiting between the second cathode separator 17C and the first anode separator 18.

Structure of MEA

The electrolyte membrane 11 has proton conductivity. The electrolyte membrane 11 may have any structure as long as it has proton conductivity. Examples of the electrolyte membrane 11 include, but are not limited to, fluoropolymer electrolyte membranes and hydrocarbon polymer electrolyte membranes. Specifically, for example, Nafion (registered trademark, available from DuPont) or Aciplex (registered trademark, available from Asahi Kasei Corporation) can be used as the electrolyte membrane 11.

The anode catalyst layer 13 is disposed on the first main surface of the electrolyte membrane 11. The anode catalyst layer 13 contains, for example, platinum as a catalyst metal; however, the catalyst metal is not limited to platinum.

The cathode catalyst layer 12 is disposed on the second main surface of the electrolyte membrane 11. The cathode catalyst layer 12 contains, for example, platinum as a catalyst metal; however, the catalyst metal is not limited to platinum.

Examples of the catalyst support in the cathode catalyst layer 12 and the anode catalyst layer 13 include, but are not limited to, a carbon powder made of, for example, carbon black or graphite; and a conductive oxide powder.

In the cathode catalyst layer 12 and the anode catalyst layer 13, the fine particles of the catalyst metal are highly dispersed and supported on the catalyst support. To increase the electrode reaction area, an ionomer component having proton conductivity is typically added to the cathode catalyst layer 12 and the anode catalyst layer 13.

The cathode gas diffusion layer 14 is disposed on the cathode catalyst layer 12. The cathode gas diffusion layer 14 is made of a porous material and has electrical conductivity and gas diffusibility. The cathode gas diffusion layer 14 preferably has elasticity so as to appropriately accommodate displacement and deformation of components caused by a difference in pressure between the cathode CA and the anode AN during operation of the electrochemical hydrogen pump 100. In the electrochemical hydrogen pump 100 according to this embodiment, a member made of carbon fiber is used as the cathode gas diffusion layer 14. For example, a porous carbon fiber sheet, such as carbon paper, carbon cloth, or carbon felt, may be used. It is not necessary to use a carbon fiber sheet as a substrate of the cathode gas diffusion layer 14. The substrate of the cathode gas diffusion layer 14 may be, for example, a sintered compact of metal fiber made of titanium, a titanium alloy, stainless steel, or other material, or a sintered compact of metal powder made of any of these material.

The anode gas diffusion layer 15 is disposed on the anode catalyst layer 13. The anode gas diffusion layer 15 is made of a porous material and has electrical conductivity and gas diffusibility. The anode gas diffusion layer 15 preferably has high rigidity so as to prevent or reduce displacement and deformation of components caused by a difference in pressure between the cathode CA and the anode AN during operation of the electrochemical hydrogen pump 100.

In the electrochemical hydrogen pump 100 according to this embodiment, the anode gas diffusion layer 15 is a member formed of a thin plate of titanium powder sintered compact; however, the anode gas diffusion layer 15 is not limited to this member. In other words, the substrate of the anode gas diffusion layer 15 may be, for example, a sintered compact of metal fiber made of titanium, a titanium alloy, stainless steel, or other material, or a sintered compact of metal powder made of any of these materials, or may be a carbon porous body. The substrate of the anode gas diffusion layer 15 may be, for example, expanded metal, metal mesh, or punched metal.

Structure of Anode Separator

The first anode separator 18 is a conductive member disposed on the anode AN of the hydrogen pump unit 100B. Specifically, the first anode separator 18 may have, in a central area of the main surface, a recess for storing the anode gas diffusion layer 15 of the hydrogen pump unit 100B.

The second anode separator 17A is a conductive member disposed on the anode AN of the hydrogen pump unit 100A. Specifically, the second anode separator 17A may have, in a central area of the main surface, a recess for storing the anode gas diffusion layer 15 of the hydrogen pump unit 100A.

The first anode separator 18 and the second anode separator 17A described above each include a metal substrate sheet 23 (see FIG. 2B) and the conductive layer CL (see FIG. 2B) disposed on the metal substrate sheet 23 and containing a metal oxide and a metal hydroxide.

In the electrochemical hydrogen pump 100 according to this embodiment, the conductive layer CL is a conductive layer 21A containing chromium oxide and chromium hydroxide. In other words, in this example, the metal oxide of the conductive layer CL is chromium oxide, and the metal hydroxide of the conductive layer CL is chromium hydroxide. The details of the structure of the conductive layer 21A will be described in Example 1.

The metal substrate sheet 23 may be made of stainless steel. In general, a passive film (not shown) containing chromium oxide forms on the surface of stainless steel through oxidation of chromium, a component of stainless steel, with oxygen in the atmosphere. When the metal substrate sheet 23 is made of stainless steel in the electrochemical hydrogen pump 100 according to this embodiment, it is easy to form a passive film containing highly corrosion-resistant chromium oxide on the surface of the metal substrate sheet 23.

For example, the metal substrate sheet 23 may be made of SUS316 or SUS316L or the like. Among various types of stainless steel, SUS316 and SUS316L are less expensive and have good properties in terms of, for example, corrosion resistance and hydrogen embrittlement resistance. The use of the metal substrate sheet 23 made of SUS316 or SUS316L in the electrochemical hydrogen pump 100 according to this embodiment can reduce the cost of the metal substrate sheet 23 while appropriately maintaining the performance of the electrochemical hydrogen pump 100.

Chromium oxide and chromium hydroxide are examples of the metal oxide and the metal hydroxide contained in the conductive layer CL. The metal oxide and the metal hydroxide are not limited to these examples. Other examples of the metal oxide and the metal hydroxide include iron oxide and iron hydroxide. Examples also include nickel oxide and nickel hydroxide. Other examples include molybdenum oxide and molybdenum hydroxide.

Structure of Cathode Separator

The first cathode separator 16 is a conductive member disposed on the cathode CA of the hydrogen pump unit 100A. Specifically, the first cathode separator 16 has, in a central area of the main surface, a recess for storing the cathode gas diffusion layer 14 of the hydrogen pump unit 100A.

The second cathode separator 17C is a conductive member disposed on the cathode CA of the hydrogen pump unit 100B. Specifically, the second cathode separator 17C has, in a central area of the main surface, a recess for storing the cathode gas diffusion layer 14 of the hydrogen pump unit 100B.

The first cathode separator 16 and the second cathode separator 17C described above each include a metal substrate sheet 33 (see FIG. 2C) and the conductive layer CL (see FIG. 2C) disposed on the metal substrate sheet 33 and containing a metal oxide and a metal hydroxide.

In the electrochemical hydrogen pump 100 according to this embodiment, the conductive layer CL is a conductive layer 31A (see FIG. 2C) containing chromium oxide and chromium hydroxide. In other words, in this example, the metal oxide of the conductive layer CL is chromium oxide, and the metal hydroxide of the conductive layer CL is chromium hydroxide. The details of the structure of the conductive layer 31A will be described in Example 2.

The metal substrate sheet 33 may be made of stainless steel. In general, a passive film (not shown) containing chromium oxide forms on the surface of stainless steel through oxidation of chromium, a component of stainless steel, with oxygen in the atmosphere. When the metal substrate sheet 33 is made of stainless steel in the electrochemical hydrogen pump 100 according to this embodiment, it is easy to form a passive film containing highly corrosion-resistant chromium oxide on the surface of the metal substrate sheet 33.

For example, the metal substrate sheet 33 may be made of SUS316 or SUS316L or the like. Among various types of stainless steel, SUS316 and SUS316L are less expensive and have good properties in terms of, for example, corrosion resistance and hydrogen embrittlement resistance. The use of the metal substrate sheet 33 made of SUS316 or SUS316L in the electrochemical hydrogen pump 100 according to this embodiment can reduce the cost of the metal substrate sheet 33 while appropriately maintaining the performance of the electrochemical hydrogen pump 100.

As described above, the hydrogen pump unit 100A is formed by sandwiching the MEA between the first cathode separator 16 and the second anode separator 17A. The hydrogen pump unit 100B is formed by sandwiching the MEA between the first anode separator 18 and the second cathode separator 17C.

Referring to FIG. 1, the first anode separator 18 in contact with the anode gas diffusion layer 15 has recesses and protrusions 20 (see FIG. 2) on a main surface adjacent to the anode AN, and these recesses form an anode gas channel groove 25. The second anode separator 17A in contact with the anode gas diffusion layer 15 has recesses and protrusions 20 (see FIG. 2) on a main surface adjacent to the anode AN, and these recesses form an anode gas channel groove 25.

The anode gas channel groove 25 has, for example, a serpentine shape including multiple U-shaped turns and multiple straight lines in plan view. However, the anode gas channel groove 25 is illustrative, and the present disclosure is not limited to this example. For example, the anode gas channel may be formed of multiple straight channels.

Chromium oxide and chromium hydroxide are examples of the metal oxide and the metal hydroxide contained in the conductive layer CL. The metal oxide and the metal hydroxide are not limited to these examples. Other examples of the metal oxide and the metal hydroxide include iron oxide and iron hydroxide. Examples also include nickel oxide and nickel hydroxide. Other examples include molybdenum oxide and molybdenum hydroxide.

Structure of Voltage Applicator

Referring to FIG. 1, the electrochemical hydrogen pump 100 includes a voltage applicator 102.

The voltage applicator 102 is a device that applies a voltage between the anode catalyst layer 13 and the cathode catalyst layer 12. Specifically, a high potential of the voltage applicator 102 is applied to the anode catalyst layer 13, and a low potential of the voltage applicator 102 is applied to the cathode catalyst layer 12. The voltage applicator 102 may have any structure as long as it can apply a voltage between the anode catalyst layer 13 and the cathode catalyst layer 12. For example, the voltage applicator 102 may be a device that regulates the voltage applied between the anode catalyst layer 13 and the cathode catalyst layer 12. Specifically, the voltage applicator 102 includes a DC/DC converter when being connected to a direct-current power supply, such as a battery, a solar cell, or a fuel cell, or includes an AC/DC converter when being connected to an alternating-current power supply, such as a commercial power supply.

The voltage applicator 102 may be, for example, an electric power-type power supply that regulates the voltage applied between the anode catalyst layer 13 and the cathode catalyst layer 12 and the current flowing between the anode catalyst layer 13 and the cathode catalyst layer 12 in such a manner that the electric power supplied to the electrochemical hydrogen pump 100 becomes a predetermined value.

Although not shown in the figure, a terminal of the voltage applicator 102 on the low potential side is connected to a cathode power supply plate, and a terminal of the voltage applicator 102 on the high potential side is connected to an anode power supply plate. The cathode power supply plate is disposed at, for example, the first cathode separator 16 of the hydrogen pump unit 100A. The anode power supply plate is disposed at, for example, the first anode separator 18 of the hydrogen pump unit 100B. The cathode power supply plate and the anode power supply plate are in electrical contact with the first cathode separator 16 and the first anode separator 18, respectively.

As described above, the electrochemical hydrogen pump 100 is a device in which application of the above voltage with the voltage applicator 102 causes hydrogen in a hydrogen-containing gas supplied onto the anode catalyst layer 13 to move onto the cathode catalyst layer 12 and pressurizes the hydrogen. In the electrochemical hydrogen pump 100, protons (H$^+$) separated from the hydrogen-containing gas in the anode AN move to the cathode CA through the electrolyte membrane 11, generating a hydrogen-containing gas in the cathode CA. The hydrogen-containing gas is, for example, a high-pressure hydrogen gas containing water vapor discharged from the cathode CA.

The electrochemical hydrogen pump 100 includes an anode gas supply passage 40 through which a hydrogen-containing gas is supplied to the anode AN from the outside and a cathode gas discharge passage 50 through which the hydrogen-containing gas is discharged from the cathode CA to the outside. The details of the structure of these passages will be described below.

Fastened Structure of Electrochemical Hydrogen Pump

Referring to FIG. 1 and FIG. 2A, the first cathode separator 16, the intermediate separator 17, and the first anode separator 18 are stacked in this order in the same direction as the stacking direction of the anode gas diffusion layer 15, the anode catalyst layer 13, the electrolyte membrane 11, the cathode catalyst layer 12, and the cathode gas diffusion layer 14 in the electrochemical hydrogen pump 100.

Although not shown in the figure, for example, a first end plate having high rigidity is disposed on the outer surface of the first cathode separator 16 of the electrochemical hydrogen pump 100 with a first insulating plate therebetween. In addition, for example, a second end plate having high rigidity is disposed on the outer surface of the first anode separator 18 of the electrochemical hydrogen pump 100 with a second insulating plate therebetween.

A fastener (not shown) fastens the members of the electrochemical hydrogen pump 100, the first insulating plate, the first end plate, the second insulating plate, and the second end plate in the stacking direction described above.

The fastener may have any structure as long as it can fasten these members in the stacking direction.

Examples of the fastener include bolts and disc spring nuts.

The bolt of the fastener may penetrate only the first end plate and the second end plate, or the bolt may penetrate the members of the electrochemical hydrogen pump 100, the first insulating plate, the first end plate, the second insulating plate, and the second end plate. The fastener applies a desired fastening pressure to the electrochemical hydrogen pump 100 in such a manner that the end surface of the first cathode separator 16 and the end surface of the first anode separator 18 are sandwiched between the first end plate and the second end plate with the first insulating plate between the first end plate and the end surface of the first cathode separator 16 and with the second insulating plate between the second end plate and the end surface of the first anode separator 18.

When the bolt of the fastener penetrates the members of the electrochemical hydrogen pump 100, the first insulating plate, the first end plate, the second insulating plate, and the second end plate, the members of the electrochemical hydrogen pump 100 are appropriately kept stacked in the stacking direction under the fastening pressure of the fastener. In addition, the members of the electrochemical hydrogen pump 100 can be appropriately prevented from moving in the in-plane direction since the bolt of the fastener penetrates the members of the electrochemical hydrogen pump 100.

In the electrochemical hydrogen pump 100 according to this embodiment, the members are accordingly stacked and integrated in the staking direction by using the fastener.

Structure of Channels of Hydrogen-Containing Gas

An example of the structure of the channel for supplying the hydrogen-containing gas to the anode AN of the electrochemical hydrogen pump 100 will be described below with reference to FIG. 1. In FIG. 1, the flow of the hydrogen-containing gas is schematically illustrated by thin dash-dotted line arrows.

Referring to FIG. 1, the electrochemical hydrogen pump 100 includes the anode gas supply passage 40.

The anode gas supply passage 40 includes, for example, a vertical channel 40H, a first horizontal channel 40A, and a second horizontal channel 40B, which communicate with each other. The vertical channel 40H is located at an appropriate position in members of the electrochemical hydrogen pump 100 and extends in the vertical direction. The first horizontal channel 40A and the second horizontal channel 40B are respectively located at appropriate positions in the second anode separator 17A and the first anode separator 18 and extend in the vertical direction. Specifically, the vertical channel 40H communicates with the anode AN of the hydrogen pump unit 100A through the first horizontal channel 40A in the second anode separator 17A. For example, the first horizontal channel 40A may be connected to an end of the anode gas channel groove 25 having a serpentine shape in the second anode separator 17A. The vertical channel 40H communicates with the anode AN of the hydrogen pump unit 100B through the second horizontal channel 40B in the first anode separator 18. For example, the second horizontal channel 40B may be connected to an end of the anode gas channel groove 25 having a serpentine shape in the first anode separator 18.

According to the above structure, the hydrogen-containing gas from the outside flows through the vertical channel 40H, the first horizontal channel 40A, and the anode AN of the hydrogen pump unit 100A in this order and flows through the vertical channel 40H, the second horizontal channel 40B, and the anode AN of the hydrogen pump unit 100B in this order, as indicated by dash-dotted line arrows in FIG. 1. In other words, the hydrogen-containing gas in the vertical channel 40H splits so as to flow into both the first horizontal channel 40A and the second horizontal channel 40B. The hydrogen-containing gas is supplied to the electrolyte membranes 11 through the anode gas diffusion layers 15.

Next, an example of the structure of the channel for discharging the hydrogen-containing gas from the cathode CA of the electrochemical hydrogen pump 100 to the outside will be described below with reference to FIG. 1. In FIG. 1, the flow of the hydrogen-containing gas is schematically illustrated by thin dash-dotted line arrows.

Referring to FIG. 1, the electrochemical hydrogen pump 100 includes the cathode gas discharge passage 50.

The cathode gas discharge passage 50 includes, for example, a vertical channel 50H, a first horizontal channel 50A, and a second horizontal channel 50B, which communicate with each other. The vertical channel 50H is located at an appropriate position in members of the electrochemical hydrogen pump 100 and extends in the vertical direction. The first horizontal channel 50A and the second horizontal channel 50B are respectively located at appropriate positions in the first cathode separator 16 and the second cathode separator 17C and extend in the vertical direction. Specifically, the vertical channel 50H communicates with the cathode AN of the hydrogen pump unit 100A through the first horizontal channel 50A in the first cathode separator 16. The vertical channel 50H communicates with the cathode CA of the hydrogen pump unit 100B through the second horizontal channel 50B in the second cathode separator 17C.

According to the above structure, the high-pressure hydrogen-containing gas pressurized in the cathode CA of the hydrogen pump unit 100A flows through the first horizontal channel 50A and the vertical channel 50H in this order, as indicated by the dash-dotted line arrows in FIG. 1. The hydrogen-containing gas is then discharged from the electrochemical hydrogen pump 100. The high-pressure hydrogen-containing gas pressurized in the cathode CA of the hydrogen pump unit 100B flows through the second horizontal channel 50B and the vertical channel 50H in this order, as indicated by the dash-dotted line arrows in FIG. 1. The hydrogen-containing gas is then discharged from the electrochemical hydrogen pump 100. In other words, the hydrogen-containing gas in the first horizontal channel 50A and the hydrogen-containing gas in the second horizontal channel 50B meet in the vertical channel 50H.

The structure of the electrochemical hydrogen pump 100 is illustrative, and the present disclosure is not limited to this example. For example, the electrochemical hydrogen pump 100 may include, at an appropriate position, an anode gas discharge passage (not shown) through which part of the hydrogen-containing gas is discharged from the anode gas channel grooves 25 instead of having a dead-end structure in which the total amount of hydrogen in the hydrogen-containing gas supplied to the anode gas channel grooves 25 of the hydrogen pump unit 100A and the hydrogen pump unit 100B is pressurized. In steady operation, about 80% or at most about 90% of hydrogen in the hydrogen-containing gas supplied from the anode gas channel groove 25 is consumed, and the unconsumed hydrogen-containing gas is discharged from the hydrogen pump unit 100A through the anode gas discharge passage (not shown). The unconsumed hydrogen-containing gas is recycled and mixed with the newly supplied hydrogen-containing gas, and the mixed gas is then supplied to the anode gas supply passage 40 of the hydrogen pump unit 100A again.

Operation

An example of the operation of the electrochemical hydrogen pump 100 according to this embodiment will be described below with reference to the drawings.

The following operation may be performed by, for example, an arithmetic circuit of a controller (not shown) reading a control program from a memory circuit of the controller. However, the following operation is not necessarily performed by the controller. An operator may operate part of the operation.

First, a low-pressure hydrogen-containing gas is supplied to the anode AN of the electrochemical hydrogen pump 100, and the voltage of the voltage applicator 102 is applied to the electrochemical hydrogen pump 100. The electrochemical hydrogen pump 100 involves the hydrogen pressurizing operation in which protons separated from the hydrogen-containing gas supplied to the anode AN move to the cathode CA through the electrolyte membrane 11 to generate pressurized hydrogen. Specifically, in the anode catalyst layer 13 of the anode AN, a hydrogen molecule dissociates into protons and electrons (formula (1)). The protons are conducted through the electrolyte membrane 11 to the cathode catalyst layer 12. The electrons move to the cathode catalyst layer 12 through the voltage applicator 102. In the cathode catalyst layer 12, a hydrogen molecule is generated again (formula (2)). It is known that a predetermined amount of water serving as electroosmosis water moves from the anode AN to the cathode CA together with protons when protons are conducted through the electrolyte membrane 11.

$$\text{Anode: } H_2(\text{low pressure}) \rightarrow 2H^+ + 2e- \qquad (1)$$

$$\text{Cathode: } 2H^+ + 2e^- \rightarrow H_2(\text{high pressure}) \qquad (2)$$

The hydrogen-containing gas generated in the cathode CA of the electrochemical hydrogen pump 100 is pressurized in the cathode CA. For example, the hydrogen-containing gas can be pressurized in the cathode CA by increasing the pressure drop in a cathode gas outlet passage by using a flow rate regulator (not shown). Examples of the flow rate regulator include a back pressure valve or regulator valve provided at the cathode gas outlet passage.

Here, reducing the pressure drop in the cathode gas outlet passage using the flow rate regulator at an appropriate time causes the hydrogen-containing gas to be discharged from the cathode CA of the electrochemical hydrogen pump 100 to the outside through the cathode gas discharge passage 50. Reducing the pressure drop in the cathode gas outlet passage using the flow rate regulator refers to increasing the degree of opening of a valve, such as a back pressure valve or a regulator valve.

Hydrogen supplied through the cathode gas outlet passage is temporarily stored in, for example, a hydrogen reservoir (not shown). The hydrogen stored in the hydrogen reservoir is supplied to a hydrogen receptor at an appropriate time. Examples of the hydrogen receptor include fuel cells, which generate electric power by using hydrogen.

From the foregoing, the electrochemical hydrogen pump 100 according to this embodiment may have higher durability and reliability than existing devices.

Specifically, the electrochemical hydrogen pump 100 according to this embodiment includes a conductive layer CL containing a metal oxide and a metal hydroxide and formed by modifying a passive film on a metal surface. For example, the electrochemical hydrogen pump 100 according to this embodiment includes a conductive layer containing chromium oxide and chromium hydroxide and formed by modifying a passive film on the surface of stainless steel. In the electrochemical hydrogen pump 100 according to this embodiment, the multilayer bodies of the first anode separator 18 and the second anode separator 17A (hereinafter anode separators) have a smaller number of layers than that of the separator disclosed in Japanese Patent No. 5353205. In the electrochemical hydrogen pump 100 according to this embodiment, the multilayer bodies of the first cathode separator 16 and the second cathode separator 17C (hereinafter cathode separators) have a smaller number of layers than that of the separator disclosed in Japanese Patent No. 5353205.

The electrochemical hydrogen pump 100 according to this embodiment can prevent or reduce a decrease in adhesion between the layers in the multilayer bodies and void generation between the layers in the multilayer bodies, resulting in high durability and high reliability of the device. The electrochemical hydrogen pump 100 according to this embodiment allows the multilayer bodies described above to have a smaller number of layers, which can reduce the costs of the anode separator and the cathode separator.

Example 1

An electrochemical hydrogen pump 100 according to Example 1 is the same as the electrochemical hydrogen pump 100 according to the embodiment except the structure of the anode separator described below.

Figure 2B:
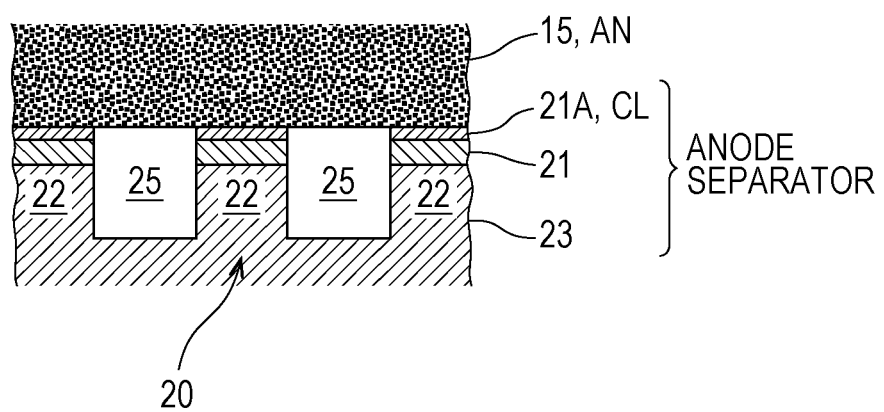
FIG. 2B is a view of an example anode separator in an electrochemical hydrogen pump in Example 1 according to the embodiment and is an enlarged view of the portion IIB in FIG. 1.

FIG. 2B is a view of an example of the anode separator in the electrochemical hydrogen pump in Example 1 according to the embodiment and is an enlarged view of the portion IIB in FIG. 1. FIG. 2B illustrates the portion IIB of the first anode separator 18 of the hydrogen pump unit 100B. The second anode separator 17A of the hydrogen pump unit 100A has the same structure as the first anode separator 18 of the hydrogen pump unit 100B, and the illustration and description of the second anode separator 17A are thus omitted.

A specific example of the anode separator will be described below in detail with reference to the drawings.

In the electrochemical hydrogen pump 100 according to Example 1, for example, a metal substrate sheet 23 having a thickness of 1.5 mm to 2 mm or more and made of stainless steel (e.g., SUS316 or SUS316L) is integrated with a sheet 21 having a thickness of about 0.1 to 0.5 mm and made of stainless steel through diffusion bonding. In diffusion bonding, the metal substrate sheet 23 undergoes diffusion bonding after the oxide film present on the surface of the metal substrate sheet 23 is removed by etching or the like in advance. This process eliminates voids in the joint between the metal substrate sheet 23 and the sheet 21 and can thus reduce the contact resistance of the electrochemical hydrogen pump 100. During operation of the electrochemical hydrogen pump 100, for example, a high pressure of about 1 MPa to 82 MPa is applied between the cathode CA and the anode AN. In Example 1, the metal substrate sheet 23 of the anode separator is formed of a stainless steel plate having a thickness of 1.5 mm to 2 mm or more. This configuration allows the anode separator to have appropriate rigidity.

The metal substrate sheet 23 of the anode separator has an anode gas channel groove 25 having a serpentine shape in plan view. The anode gas channel groove 25 is formed by, for example, producing the recesses and protrusions 20 in sectional view by etching or cutting the main surface of the metal substrate sheet 23. Only portions of protrusions 22 of the metal substrate sheet 23 that face the anode AN are integrated with a first main surface of the sheet 21 through diffusion bonding.

In the electrochemical hydrogen pump 100, the anode separator has, in the main surface, the anode gas channel groove 25, appearing to be recesses and protrusions in sectional view, through which the hydrogen-containing gas used for electrochemical reactions is uniformly supplied to the anode gas diffusion layer 15. In this case, the main surface of the anode gas diffusion layer 15 is not in contact with the inner surface of the anode gas channel groove 25 but in contact with only the protrusions 22 through the conductive layer 21A containing chromium oxide and chromium hydroxide and the sheet 21.

The sheet 21 has, on a second main surface, the conductive layer 21A having a thickness more than or equal to 0.001 μm and less than or equal to 5 μm (e.g., about 0.01 μm). The conductive layer 21A has high conductivity and high corrosion resistance, and the anode gas diffusion layer 15 is disposed on the conductive layer 21A. In other words, the conductive layer 21A having high conductivity and high corrosion resistance and the sheet 21 are preferably disposed only in a region of the anode separator that is in contact with the anode gas diffusion layer 15.

Referring to FIG. 3, the conductive layer 21A is, for example, a layer containing chromium hydroxide and chromium oxide and formed by modifying a chromium oxide-containing passive film on the surface of the sheet 21 through electrochemical injection of protons ($H^+$). In other words, chromium hydroxide in the conductive layer 21A is produced by introducing protons to the passive film containing chromium oxide.

In this case, the conductive layer 21A may contain at least one of fluorine at a fluorine concentration of 0.1 atom % or more or lithium at a lithium concentration of 0.01 atom % or more. This configuration improves the conductivity of the conductive layer 21A and improves the corrosion resistance of the conductive layer 21A to prevent or reduce degradation of the conductive layer 21A.

As described above, in the electrochemical hydrogen pump 100 according to Example 1, the content of highly conductive chromium hydroxide can be appropriately increased in the passive film containing less conductive chromium oxide.

Since the method for electrochemically injecting protons ($H^+$) into the passive film containing chromium oxide and the method for injecting fluorine and lithium into the passive film are known (WO 2008/136306), a detailed description of these methods is thus omitted.

For example, the sheet 21 having the conductive layer 21A can be easily blanked out, with an appropriate press die, from a commercial coat material manufactured by using rolling-mill rolls. For example, a commercial coat material may be cut into a circular shape having a diameter of about 80 mm to 130 mm by pressing the commercial coat material so as to have an opening corresponding to the anode gas channel groove 25 having a serpentine shape in plan view, and the coat material having a circular shape may be then diffusion-bonded to the metal substrate sheet 23.

Although not shown in the figure, a passive film containing highly corrosion-resistant chromium oxide is formed in a region of the anode separator that has no conductive layer 21A or sheet 21.

The structure of the anode separator and the method for producing the anode separator are illustrative, and the present disclosure is not limited to this example.

The electrochemical hydrogen pump 100 according to Example 1 may be the same as the electrochemical hydrogen pump 100 according to the embodiment except the above features.

Example 2

An electrochemical hydrogen pump 100 according to Example 2 is the same as the electrochemical hydrogen pump 100 according to the embodiment except the structure of the cathode separator described below.

Figure 2C:
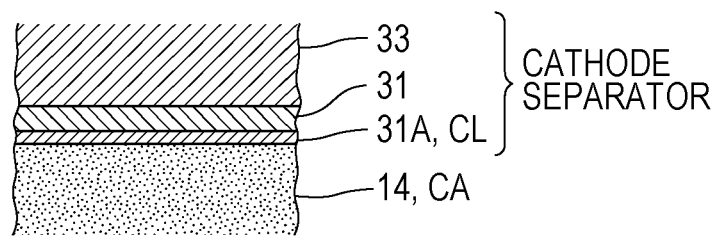
FIG. 2C is a view of an example cathode separator in an electrochemical hydrogen pump in Example 2 according to the embodiment and is an enlarged view of the portion IIC in FIG. 1.

FIG. 2C is a view of an example cathode separator in the electrochemical hydrogen pump in Example 2 according to the embodiment and is an enlarged view of the portion IIC in FIG. 1. FIG. 2C illustrates the portion IIC of the first cathode separator 16 of the hydrogen pump unit 100A. The second cathode separator 17C of the hydrogen pump unit 100B has the same structure as the first cathode separator 16 of the hydrogen pump unit 100A, and the illustration and description of the second cathode separator 17C are thus omitted.

A specific example of the cathode separator will be described below in detail with reference to the drawings.

In the electrochemical hydrogen pump 100 according to Example 2, for example, a metal substrate sheet 33 having a thickness of 1.5 mm to 2 mm or more and made of stainless steel (e.g., SUS316 or SUS316L) is integrated with a sheet 31 having a thickness of about 0.1 to 0.5 mm and made of stainless steel through diffusion bonding. This configuration eliminates voids in the joint between the metal substrate sheet 33 and the sheet 31 and can thus reduce the contact resistance of the electrochemical hydrogen pump 100. In diffusion bonding, the metal substrate sheet 33 undergoes diffusion bonding after the oxide film present on the surface of the metal substrate sheet 33 is removed by etching or the like in advance.

The metal substrate sheet 33 of the cathode separator has a recess for storing the cathode gas diffusion layer 14. The recess is formed by, for example, etching or cutting the main surface of the metal substrate sheet 33. Only the bottom surface of the recess of the metal substrate sheet 33 is integrated with a first main surface of the sheet 31 through diffusion bonding.

In other words, the gas pressure in the cathode gas diffusion layer 14 is high during operation of the electrochemical hydrogen pump 100. This configuration eliminates the necessity of a channel groove on the bottom surface of the recess of the metal substrate sheet 33 of the cathode separator. By providing a communication hole at an appropriate position in the metal substrate sheet 33, the hydrogen-containing gas can be released from the electrochemical hydrogen pump 100 to the outside. The inside of the recess communicates with the outside of the recess through the communication hole. In this case, the main surface of the cathode gas diffusion layer 14 may be, for example, in surface contact with the entire bottom surface of the recess of the metal substrate sheet 33 of the cathode separator.

The conductive layer 31A having a thickness more than or equal to 0.001 μm and less than or equal to 5 μm (e.g., about 0.01 μm) is formed on the second main surface of the sheet 31. The conductive layer 31A has high conductivity and high corrosion resistance, and the cathode gas diffusion layer 14 is disposed on the conductive layer 31A. In other words, the conductive layer 31A having high conductivity and high corrosion resistance and the sheet 31 are preferably disposed only in a region of the cathode separator that is in contact with the cathode gas diffusion layer 14.

Although not shown in the figure, the conductive layer 31A is, for example, a layer containing chromium hydroxide and chromium oxide and formed by modifying a chromium oxide-containing passive film on the surface of the sheet 31 through electrochemical injection of protons (H$^+$). In other words, chromium hydroxide in the conductive layer 31A is produced by introducing protons to the passive film containing chromium oxide.

In this case, the conductive layer 31A may contain at least one of fluorine at a fluorine concentration of 0.1 atom % or more or lithium at a lithium concentration of 0.01 atom % or more. This configuration improves the conductivity of the conductive layer 21A and improves the corrosion resistance of the conductive layer 21A to prevent or reduce degradation of the conductive layer 21A.

As described above, in the electrochemical hydrogen pump 100 according to Example 2, the content of highly conductive chromium hydroxide can be appropriately increased in the passive film containing less conductive chromium oxide.

Since the method for electrochemically injecting protons (H$^+$) into the passive film containing chromium oxide and the method for injecting fluorine and lithium into the passive film are known (WO 2008/136306), a detailed description of these methods is omitted.

For example, the sheet 31 having the conductive layer 31A can be easily blanked out, with an appropriate press die, from a commercial coat material manufactured by using rolling-mill rolls. For example, a commercial coat material may be cut into a circular shape having a diameter of about 80 mm to 130 mm by pressing the commercial coat material, and the coat material having a circular shape may be then diffusion-bonded to the metal substrate sheet 33.

Although not shown in the figure, a passive film containing highly corrosion-resistant chromium oxide may be formed in a region of the cathode separator that has no conductive layer 31A or sheet 31.

The structure of the cathode separator and the method for producing the cathode separator are illustrative, and the present disclosure is not limited to this example.

The electrochemical hydrogen pump 100 according to Example 2 may be the same as the electrochemical hydrogen pump 100 according to the embodiment except the above features.

Evaluation of Cathode Separator
(A) Evaluation of Corrosion Resistance
Test Piece The following test pieces were used in this evaluation.

Test pieces of Examples: a member in which the sheet 31 having the conductive layer 31A was diffusion-bonded to the metal substrate sheet 33.

Test piece of Comparative Example 1: the same member as the test pieces of Examples except that a graphite-deposited sheet was used.

Test piece of Comparative Example 2: the same member as the test pieces of Examples except that a graphene-deposited sheet was used.

Evaluation Method

In this evaluation, electrochemical analysis was carried out by dipping, in an appropriate sulfuric acid aqueous solution at pH 3, three electrodes composed of a working electrode (test piece), a counter electrode (platinum), and a reference electrode (mercury-mercury sulfate-sulfuric acid solution).

In the electrochemical analysis, a predetermined voltage corresponding to the operating voltage of the electrochemical hydrogen pump 100 was applied between the working electrode and the reference electrode for about 100 hours, and the current flowing through the test piece and the counter electrode was then measured.

Evaluation Results

All of the test pieces of Examples, the test piece of Comparative Example 1, and the test piece of Comparative Example 2 showed a corrosion current density less than or equal to 0.1 μA/cm$^2$. This reveals that the test pieces of Examples have sufficient performance in terms of corrosion resistance like the carbon-based test piece of Comparative Example 1 and the carbon-based test piece of Comparative Example 2.

(B) Evaluation of Conductivity (B-1) Evaluation of Sheet Alone

Test Piece

The following test pieces were used in this evaluation.

Test pieces of Examples: a member of the sheet 31 having the conductive layer 31A Test piece of Comparative Example 1: the same sheet member as the test pieces of Examples except that graphite was deposited.

Test piece of Comparative Example 2: the same sheet member as the test pieces of Examples except that graphene was deposited.

Evaluation Results

All of the test pieces of Examples, the test piece of Comparative Example 1, and the test piece of Comparative Example 2 showed an area resistance, including contact resistance, less than or equal to 3 mΩ/cm$^2$ under a pressure of 1 MPa or more. This reveals that the test pieces of Examples have sufficient performance in terms of conductivity like the carbon-based test piece of Comparative Example 1 and the carbon-based test piece of Comparative Example 2.

(B-2) Evaluation of Separator

Test Piece

The following test pieces were used in this evaluation.

Test pieces of Examples: a member in which the sheet 31 having the conductive layer 31A is diffusion-bonded to the metal substrate sheet 33

Test piece of Comparative Example 1: the same member as the test pieces of Examples except that a graphite-deposited sheet was used.

Test piece of Comparative Example 2: the same member as the test pieces of Examples except that a graphene-deposited sheet was used.

Evaluation Results

All of the test pieces of Examples, the test piece of Comparative Example 1, and the test piece of Comparative Example 2 showed a larger area resistance including contact resistance than the sheet alone, which was, however, less than or equal to 3 mf/cm$^2$ under a pressure of 1 MPa or more. This reveals that the test pieces of Examples have sufficient performance in terms of conductivity like the carbon-based test piece of Comparative Example 1 and the carbon-based test piece of Comparative Example 2.

The embodiment, Example 1 according to the embodiment, and Example 2 according to the embodiment may be combined with each other unless they exclude each other.

From the above description, many improvements and other embodiments of the present disclosure are apparent to those skilled in the art. Therefore, the above description should be construed as illustrative only and is for the purpose of teaching those skilled in the art the best modes for carrying out the present disclosure. The details of the structure and/or function of the present disclosure can be substantially modified without departing from the spirit of the present disclosure.

For example, the MEA, the anode separator, and the cathode separator in the electrochemical hydrogen pump 100 according to the embodiment can be used as an MEA, an anode separator, and a cathode separator in other electrochemical devices, such as electrolyzers and fuel cells.

One aspect of the present disclosure can be used as an electrochemical device that may have higher durability and reliability than existing devices.

What is claimed is:

1. An electrochemical device, comprising:
   an electrolyte membrane;
   an anode disposed on a first main surface of the electrolyte membrane;
   a cathode disposed on a second main surface of the electrolyte membrane;
   an anode separator disposed on the anode; and
   a cathode separator disposed on the cathode,
   wherein at least one of the anode separator or the cathode separator includes a metal substrate sheet, a sheet made of stainless steel, and a conductive layer disposed on the sheet made of stainless steel and containing a metal oxide and a metal hydroxide,
   wherein the sheet made of stainless steel is integrated with the metal substrate sheet by diffusion bonding, and
   wherein the sheet made of stainless steel has a thickness of 0.1 to 0.5 mm and the metal substrate sheet has a thickness of 1.5 to 2 mm.

2. The electrochemical device according to claim 1, wherein the metal hydroxide is produced by introducing protons to a metal oxide-containing layer.

3. The electrochemical device according to claim 1, wherein the metal oxide is chromium oxide, and the metal hydroxide is chromium hydroxide.

4. The electrochemical device according to claim 1, wherein the metal substrate sheet is made of stainless steel.

5. The electrochemical device according to claim 4, wherein the metal substrate sheet is made of SUS316 or SUS316L.

6. The electrochemical device according to claim 4, wherein the metal substrate sheet is made of 4401-316-00-I or 4436-316-00-I.

7. The electrochemical device according to claim 4, wherein the metal substrate sheet is made of 1.4401 or 1.4436.

8. The electrochemical device according to claim 4, wherein the metal substrate sheet is made of S31600 or S31603.

9. The electrochemical device according to claim 4, wherein the metal substrate sheet is made of S31608 or S31603.

10. The electrochemical device according to claim 1, wherein the conductive layer has a thickness more than or equal to 0.001 μm and less than or equal to 5 μm.

11. The electrochemical device according to claim 1, wherein the conductive layer contains at least one of fluorine at a fluorine concentration of 0.1 atom % or more or lithium at a lithium concentration of 0.01 atom % or more.

12. The electrochemical device according to claim 1, further comprising an anode gas diffusion layer disposed on the conductive layer of the anode separator.

13. The electrochemical device according to claim 12, wherein the conductive layer of the anode separator is disposed only in a region of the anode separator that is in contact with the anode gas diffusion layer.

14. The electrochemical device according to claim 4, wherein the metal substrate sheet is made of 4404-316-03-I, 4432-316-03-1, or 4436-316-91-I.

15. The electrochemical device according to claim 4, wherein the metal substrate sheet is made of 1.4404, 1.4432, or 1.4435.

* * * * *